Patented June 12, 1928.

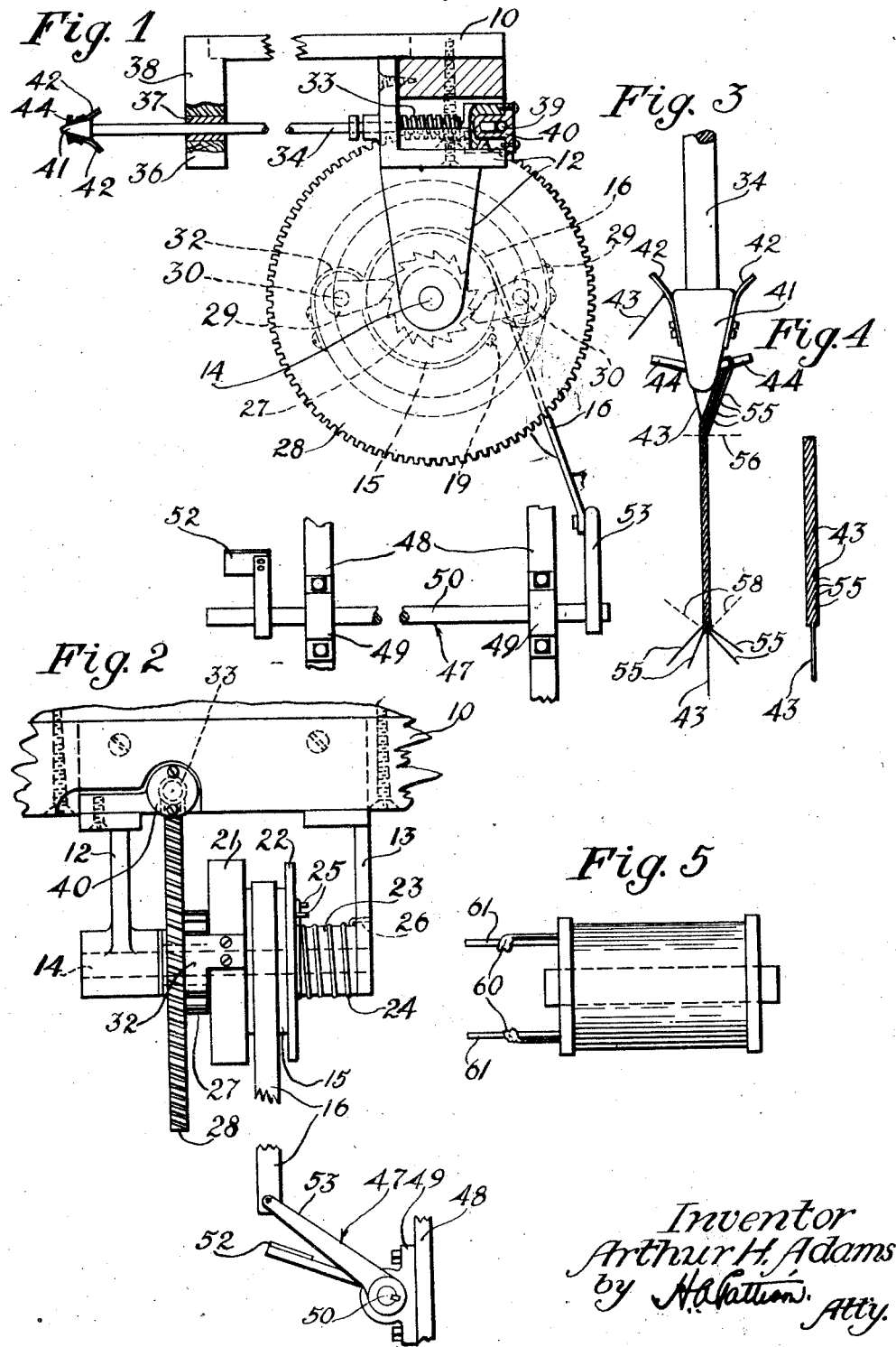

1,672,866

UNITED STATES PATENT OFFICE.

ARTHUR HERMAN ADAMS, OF LA GRANGE, ILLINOIS, ASSIGNOR TO WESTERN ELECTRIC COMPANY, INCORPORATED, OF NEW YORK, N. Y., A CORPORATION OF NEW YORK.

METHOD OF AND APPARATUS FOR MAKING CONDUCTOR TERMINALS.

Application filed July 3, 1924. Serial No. 724,021.

This invention relates to methods of and apparatus for making conductor terminals, and more particularly to methods of and apparatus for making reinforced terminals for fine wire magnet and resistance coils and the like.

Heretofore in the construction of terminals for coils the practice has been to splice larger, and usually stranded terminals, to the wire of the coil by twisting together by hand the ends of the coil and of the stranded terminal wire or cable and thereafter soldering them together. This method, as demonstrated by its use, has certain disadvantages both as to the manner of producing a reinforced terminal of this type and as to the finished terminal. The hand method is costly in that it consumes more time, both due to the necessity of twisting the ends together by hand and of soldering them. The finer sizes of wire used in winding coils, due to the use of the solder, become very brittle next to the splice on account of the alloying of the solder with the metal, usually copper, of the fine wire, thereby resulting in frequent breakage thereof. Furthermore, the spliced portion, due to the solder used, is quite stiff, is also likely to bear slight humps or points of solder, or solder-stiffened ends of fine wire, and is therefore likely to penetrate the paper or other insulation put over it during the winding of the coil, such penetration will usually cause turns of the coil to be short circuited and may result in a defective coil.

The objects of the invention are to provide an improved method of and an apparatus for efficiently and economically producing a reinforced terminal for fine wire coils of maximum mechanical strength and flexibility, and one which reduces to a minimum the chance of causing short circuiting between the convolutions of the coil.

In order to attain these objects in accordance with one embodiment of the invention and as applied particularly to fine wire coils, a plurality of preferably tinned copper wires of suitable diameter are arranged parallel with the end of the wire forming the coil which has been cleaned for a suitable distance at the proper place to connect with the terminal post, and then the wires are twisted into a stranded terminal without the use of solder or other retaining means. Thereafter the stranded terminal is soldered to the terminal post.

Various features of the invention not specifically mentioned will clearly appear from the following description taken in connection with the accompanying drawings, in which Fig. 1 is a fragmentary side view partly in section of a mechanism for forming a reinforced terminal in accordance with the invention.

Fig. 2 is an end view thereof;

Fig. 3 is an enlarged fragmentary plan view of the rotatable spindle for stranding the wires to form the reinforced terminal and illustrating in detail the holding means for the wires during the stranding thereof and a reinforced terminal upon completion of the stranding operation;

Fig. 4 is a greatly enlarged plan view of a finished reinforced terminal produced according to the method, and Fig. 5 is a view of a magnet coil provided with terminal posts to which the reinforced coil terminals produced according to the method are soldered.

It is believed that a complete understanding of the improved method as well as the article produced thereby will be procured from a description of the apparatus by means of which the method may be practiced. This apparatus comprises a bench top plate 10 which may be the bench supporting the coil winding mechanism, the bench being provided with supports (not shown). From the underside of the bench 10 is carried by brackets 12 and 13 (Fig. 2) a stationary shaft 14. Mounted to rotate freely upon the shaft 14 is a pulley or wheel 15, and passing substantially around the periphery thereof is a belt 16 with one end thereof suitably secured to the periphery of the wheel by a screw 19. The wheel 15 is formed with flanges 21 and 22 (Fig. 2) and positioned between the outside of the flange 22 and the inside of the bracket 13. Around a hub 23 formed upon the bracket 13 is a torsion spring 24 with one end thereof held between two pins 25 carried upon the face of the flange 22 and the opposite end entered within an opening formed in the bracket 13 as indicated at 26. The spring 24 is arranged so that upon a clockwise movement of the pulley 15, as viewed in Fig. 1, energy will be stored in the spring. Free to rotate upon the shaft 14 independently of the wheel 15 and positioned between the outside face of the flange 21 and the inside of the bracket 12 is a ratchet wheel 27 having suitably secured thereto a worm gear 28. The outside face of the flange 21 supports at diametrically opposite points pawls 29 which engage the teeth of the ratchet wheel 27 (Fig. 1). The pawls 29 are pivotally supported upon the flange 22 by pins 30 and are normally held in engagement with the ratchet teeth by leaf springs 32 acting in a clockwise direction upon the pawls, the springs 32 being secured to the peripheral face of the flange 21. Meshing with the worm gear 28 is a worm 33 fixed to a spindle 34 which is carried upon the underside of the bench top 10 by the bracket 12. A depending flange 36 of the bench top 10 carries a bearing member 37 to give suitable support to that portion of the spindle which projects outside of the front face 38 of the bench. A thrust bearing for the right hand end of the spindle 34 as viewed in Fig. 1 is provided in the form of a hard steel ball 39 carried within a bushing 40 supported by the bracket 12, the ball being in axial alignment with the spindle 34.

The projecting portion of the spindle 34 carries at its end a tapered head 41 and secured thereto at diametrically opposite points are spring clips 42 (Fig. 3) for firmly holding the end of the wire 43 of the coil during the reinforcing thereof. Secured to the tip of the head 40, forward of the clips 42, is a pin or double hook 44 for twisting the reinforcing wires. During the reinforcing of a terminal only one of the clips 42 and one end of the pin 44 is used, but two clips 42 are provided upon the head 40 and the pin 44 projects at opposite sides of the head in order that, whichever side of the spindle may come to rest, there shall be conveniently available one spring clip and one end of the double pin or hook.

A foot treadle mechanism 47 is illustrated for applying motion to the belt 16 to cause rotation of the wheel 15, but it will readily be understood that other suitable operating means may be substituted therefor. In the drawings, for the purpose of saving space, the foot treadle mechanism has been shown relatively close to the mechanism carried by the bench 10, but in reality it is suitably spaced therefrom so that an operator may conveniently sit in front of the mechanism and by the use of her foot operate the treadle mechanism. This treadle mechanism comprises a frame 48 and mounted thereon by brackets or bearings 49 is a shaft 50 carrying at its left hand end as viewed in Fig. 1 a foot treadle 52 and at its opposite end an arm 53 to which one end of the belt 16 is suitably attached. It will readily be seen that by pressing down upon the foot treadle 52 as viewed in Fig. 2 and through the arm 53 and the connecting belt 16 that the wheel 15 will be given substantially one rotation in a clockwise direction as viewed in Fig. 1. Through the pawls 29 mounted upon the flange 22 of the wheel 15 the ratchet wheel 27 and worm gear 28 will also be revolved, and due to the relatively larger diameter of the gear 28 as compared to the worm 33, the latter will cause the spindle 34 to be given a larger number of turns and revolved at a comparatively high rate of speed during substantially one revolution of the gear 28. It will be seen that for one complete treadle operation an approximately definite number of revolutions is given to the spindle, which means that each reinforced conductor terminal produced contains about the same number of twists. The twist per inch or the tightness of the twist is, therefore, dependent upon the length of wire measured off to form the terminal.

During the downward movement of the foot treadle 52 energy will be stored in the torsion spring 24 which functions to return the wheel 15 to its normal position upon a release of the foot treadle 52 by the operator, and during this return, the belt 16 will be taken up upon the wheel 15 ready for the next depression of the foot treadle 52, the pawls merely passing over the teeth on the ratchet wheel 27.

The operation of the apparatus is as follows: The operator anchors the end of the wire 43 which may be either the beginning or ending of the coil, to the head 41 by looping it over either of the clips 42 and then cleaning or skinning it of any enamel or other insulating material thereon for a sufficient distance to insure that a good electrical contact will be formed between it and the reinforcing wire to be stranded therewith or at the proper portion along its length so that it may be suitably soldered later to a terminal post. A spool containing preferably a pair of parallelly arranged tinned wires 55 of suitable diameter is arranged convenient to the operator who unwinds a sufficient length therefrom and loops the pair of wires over either end of the pin 44, thus providing four wires 55 for reinforcing the end portion of the wire of the coil. The operator thereafter holds the reinforcing and coil wires tautly and substantially parallel with the axis of the spindle 34 and then depresses the foot treadle 52, which through the mechanism described before, causes the spindle 34 to be given a large and fairly definite number of turns at a high rate of speed, thereby producing in a minimum of time, a stranded terminal, comprising four tinned wires and the enameled or other wire of the coil winding which terminal will be of maximum mechanical strength and flexibility. Upon completion of the stranding operation the operator removes the stranded terminal from the spindle and during this removal clips with a pair of scissors the stranded wires, along the broken line indicated by the numeral 56 (Fig. 3) which forms the end portion of the reinforced terminal for the end of the wire of the coil. Then the opposite end of the reinforced terminal is trimmed by clipping the unstranded ends of the reinforcing wires close to the coil wire 43 along the broken lines indicated by the numeral 58.

By referring to Fig. 4 it will be seen that the finished terminal comprises the coil terminal wire 43 and the reinforcing wires 55 as a whole helically wound into a single stranded terminal.

Fig. 5 illustrates the manner in which coil terminals produced according to the invention may be connected by solder indicated by the numeral 60 to terminal posts 61 which may be either mounted on the coil or other mounting apparatus.

What is claimed is:

1. A mechanism for reinforcing terminals for electrical conductors, comprising a rotatable element, means carried thereby for holding a portion of the conductor and a portion of another strand to said element, driving means for said element, means for actuating said driving means a predetermined amount, and means for returning said actuating means to normal.

2. A mechanism for reinforcing terminals for electrical conductors, comprising a rotatable spindle, means carried thereby for holding a portion of the conductor and a portion of another strand to said spindle in longitudinal relation to each other, driving means for said spindle, means for actuating said driving means a predetermined amount, and means for returning said actuating means to normal.

3. A mechanism for reinforcing terminals for electrical conductors, comprising a rotatable spindle having a tapered end adapted to hold an end portion of the conductor and a portion of another strand in axial alignment with the spindle, and means for rotating said spindle.

4. A mechanism for reinforcing terminals for electrical conductors, comprising a rotatable spindle, means carried thereby for holding a portion of the conductor and a portion of another strand to said spindle in longitudinal relation to each other, driving means for said spindle, means for actuating said driving means a predetermined amount, and means including a spring for returning said actuating means to normal.

5. A mechanism for reinforcing terminals for electrical conductors, comprising a rotatable element, means carried thereby for holding a portion of the conductor and a portion of another strand to said element, means for driving said element in one direction, means for actuating said driving means a predetermined amount, and means including a spring for returning said actuating means to normal.

6. A mechanism for reinforcing terminals for electrical conductors, comprising a rotatable spindle, means carried thereby for holding a portion of the conductor and a portion of another strand to said spindle in longitudinal relation to each other, means for driving said spindle in one direction, means for actuating said driving means a predetermined amount, and means including a spring for returning said actuating means to normal.

7. A mechanism for reinforcing terminals for electrical conductors, comprising a rotatable spindle, a clip carried thereby for holding an end of a conductor, a pin carried by the spindle for engaging a loop of a strand, and means for driving the spindle to rotate the strand and conductor thereby forming an integral reinforced terminal.

In witness whereof, I hereunto subscribe my name this 21st day of June, A. D. 1924.

ARTHUR HERMAN ADAMS.